United States Patent
Gerhardt et al.

(10) Patent No.: US 9,862,267 B2
(45) Date of Patent: Jan. 9, 2018

(54) FUEL COLLECTION DEVICE FOR A FUEL TANK IN A MOTOR VEHICLE

(71) Applicants: Continental Automotive GmbH, Hannover (DE); Bayerische Motoren Werke AG, Munich (DE)

(72) Inventors: Marc Gerhardt, Dortmund (DE); Peter Menzl, Ottobrunn (DE); Markus Wellhäuser, Unterbachern (DE); Tobias Schneider, Munich (DE); Toni Heimer, Unterschleissheim (DE)

(73) Assignee: Continental Automotive GmbH, Hannover (DE)

( * ) Notice: Subject to any disclaimer, the term of this patent is extended or adjusted under 35 U.S.C. 154(b) by 22 days.

(21) Appl. No.: 15/105,324

(22) PCT Filed: Dec. 12, 2014

(86) PCT No.: PCT/EP2014/077495
§ 371 (c)(1),
(2) Date: Jun. 16, 2016

(87) PCT Pub. No.: WO2015/091238
PCT Pub. Date: Jun. 25, 2015

(65) Prior Publication Data
US 2016/0318391 A1 Nov. 3, 2016

(30) Foreign Application Priority Data
Dec. 17, 2013 (DE) .......... 10 2013 226 295

(51) Int. Cl.
*B60P 3/00* (2006.01)
*B60K 15/077* (2006.01)
*B60K 15/03* (2006.01)

(52) U.S. Cl.
CPC ............ *B60K 15/077* (2013.01); *B60K 15/03* (2013.01); *B60K 2015/03111* (2013.01); *B60K 2015/03467* (2013.01); *B60K 2015/0777* (2013.01)

(58) Field of Classification Search
CPC ................. B60K 15/077; B60K 15/03; B60K 2015/03111; B60K 2015/0777;
(Continued)

(56) References Cited

U.S. PATENT DOCUMENTS 4,157,146 A * 6/1979 Svenson .................. F16J 13/06
220/324
4,270,668 A * 6/1981 Berfield .................... A47L 9/00
220/324
(Continued)

FOREIGN PATENT DOCUMENTS

DE 68903628 T2 7/1996
DE 19963380 A1 7/2001
(Continued)

Primary Examiner — Kareen Thomas
(74) Attorney, Agent, or Firm — Cozen O'Connor

(57) ABSTRACT

In a fuel collection device for a fuel tank in a motor vehicle, a swirl pot is connected, by a catching connection and a locking connection, to a holding element mounted in the fuel tank. The catching connection, along with a supporting element, allows the swirl pot to be secured in a plane. The locking connection retains the swirl pot on the holding element. A sliding element allows the locking connection to be blocked.

10 Claims, 2 Drawing Sheets

(58) Field of Classification Search
CPC .......... B60K 2015/03256; B60K 2015/03236; B60K 2015/03467
USPC .... 220/562, 582, 4.13, 4.14, 4.15, 601, 625, 220/661, 676, 692, 560.04–560.15, 324, 220/327
See application file for complete search history.

(56) References Cited

U.S. PATENT DOCUMENTS

| | | | |
|---|---|---|---|
| 5,044,526 | A | 9/1991 | Sasaki et al. |
| 5,437,387 | A * | 8/1995 | Burns ..................... B01L 99/00 215/213 |
| 5,931,353 | A | 8/1999 | Guyomard et al. |
| 6,874,756 | B2 | 4/2005 | Hawkins et al. |
| 7,665,446 | B2 | 2/2010 | Eck et al. |
| 9,102,231 | B2 * | 8/2015 | Nakajima ............ B60K 15/077 |
| 2001/0012359 | A1 | 8/2001 | Gester et al. |
| 2003/0057213 | A1 * | 3/2003 | Souma ................. B60K 15/035 220/562 |
| 2004/0154670 | A1 * | 8/2004 | Gerhardt .......... B60K 15/03504 137/588 |
| 2011/0017748 | A1 * | 1/2011 | Palma ................. B60K 15/077 220/562 |

FOREIGN PATENT DOCUMENTS

| | | |
|---|---|---|
| DE | 10 2006 003420 A1 | 8/2007 |
| DE | 20 2009 001 975 U1 | 5/2009 |
| DE | 102010010571 A1 | 9/2011 |
| EP | 0 712 752 A1 | 5/1996 |
| EP | 0 875 411 A2 | 11/1998 |
| FR | 2 774 948 A1 | 8/1999 |

* cited by examiner

FUEL COLLECTION DEVICE FOR A FUEL TANK IN A MOTOR VEHICLE

CROSS-REFERENCE TO RELATED APPLICATIONS

This is a U.S. national stage of application No. PCT/EP2014/077495, filed on 12 Dec. 2014, which claims priority to the German Application No. 10 2013 226 295.7 filed 17 Dec. 2013, the content of both incorporated herein by reference.

BACKGROUND OF THE INVENTION

1. Field of the Invention

The invention relates to a fuel collection device for a fuel tank of a motor vehicle with a splash pot for collecting fuel, with a holding element which is to be fastened to the bottom of the fuel tank, and with a fastener for fastening the splash pot to the holding element.

2. Related Art

Fuel collection devices of this type are frequently used in current motor vehicles and are known from practice. The fuel is collected in the splash pot and is delivered by a fuel delivery device to an internal combustion engine of the motor vehicle. In the mounted state, the splash pot of the known fuel collection device is held on the bottom of the fuel tank of the motor vehicle by the holding element. The holding element is welded to the bottom of the fuel tank. The mounting of the splash pot on the holding element takes place through a mounting opening in the fuel tank. Since the mounting opening usually has only very small dimensions, the fasteners are not visible during the mounting of the splash pot on the holding element.

SUMMARY OF THE INVENTION

An object of the present invention is to solve the problem of developing a fuel collection device of the type mentioned at the outset in such a way that the splash pot can be mounted simply and that the fastening of the splash pot to the holding element is ensured reliably after mounting.

According to an aspect of the invention, the problem is solved by the fastener having a hook-in connection with at least one hook arranged on the splash pot or the holding element and with a recess arranged on that component of the holding element or the splash pot which lies opposite in each case, for pivoting in of the hook, and a latching connection arranged so as to lie opposite the hook-in connection and fix the splash pot transversely with respect to the mounting direction of the hook-in connection.

As a result of this design, the splash pot can first of all be mounted simply on the holding element via the hook-in connection, by the hook being plugged and pivoted into the recess. Subsequently, the latching connection between the splash pot and the holding element is produced. As a result, mounting is particularly simple. The latching connection can be latched in without errors only when the hook-in connection is produced as provided. Latching of this type of the latching connection can be detected haptically. Incorrect mounting of the splash pot is avoided in this way.

According to another advantageous development of the invention, the provided positioning of the splash pot with respect to the holding element is particularly simple if the hook-in connection has two recesses arranged on the splash pot or the holding element and are spaced apart from one another, and if that component of the holding element or the splash pot that lies opposite the recesses has two projections that penetrate into the recesses. Furthermore, the splash pot is supported in a manner distributed to a plurality of locations, with the result that the connection of the splash pot to the holding element has high stability.

According to another advantageous development of the invention, a contribution is made to further securing the splash pot in the plane of the hook-in connection and the latching connection if a support between the recesses has a width that corresponds to the clear distance of the projections. Furthermore, the design leads to a simplification of mounting, since the splash pot is necessarily oriented with respect to the holding element as provided if the hook-in connection can be pivoted in.

According to another advantageous development of the invention, a contribution is made to securing the splash pot against unintentional release if the splash pot is supported by a supporting element transversely with respect to the mounting direction of the hook-in connection.

According to another advantageous development of the invention, the fuel collection device is of structurally particularly simple design if the supporting element is arranged closer to the latching connection than to the hook-in connection. In addition, the design leads to the latching connection being relieved of operating forces which act on the splash pot.

According to another advantageous development of the invention, the fuel collection device can be manufactured particularly simply if the supporting element has a centering pin that projects from the holding element or the splash pot, and that component of the splash pot or the holding element that lies opposite in each case has a depression for receiving the centering pin with an accurate fit. As a result of this design, the splash pot is secured against rotation in the mounted state.

According to another advantageous development of the invention, a contribution is made to further simplifying the mounting of the fuel collection device if the centering pin projects perpendicularly from the holding element and is arranged close to the latching connection. In addition, the arrangement of the centering pin close to the latching connection leads to mechanical relieving of the latching connection. During mounting, the splash pot can be plugged simply into the hook-in connection and can be pivoted toward the holding element, with the result that the centering pin passes into the depression and the latching connection can latch in. In the case of incorrect mounting of the splash pot, the centering pin would be situated next to the depression and therefore prevent latching in of the latching connection. It is ensured here with tactile latching in of the latching connection that the splash pot is mounted as provided.

Components arranged fixedly in the fuel tank cannot be replaced in the case of damage. An arrangement of movable components of the latching connection on the holding element might lead to the latching connection being damaged in the case of incorrect mounting of the splash pot and therefore it being necessary for the holding element together with the fuel tank to be disposed of. According to another advantageous development of the invention, damage of movable components of the latching connection can be restricted to the splash pot if a spring element of the latching connection is arranged on the splash pot, and if the holding element has exclusively fixed components of the latching connection. As a result of this design, the components of the fuel collection device that are to be fastened in the fuel tank have particularly high stability. Possible damage of the movable components of the latching connection is restricted to the splash pot which can be replaced easily.

According to another advantageous development of the invention, the latching connection is of structurally particularly simple design if the spring element of the latching connection is configured as a web that is manufactured in one piece with the splash pot and is of resilient design, and if the holding element has a latching lug that engages behind the web.

Error-free mounting of the fuel collection device can be ensured reliably according to another advantageous development of the invention if the splash pot has a slide for blocking the latching connection, and if the slide can be displaced exclusively in the mounted position of the latching connection and is blocked in the disconnected latching connection.

BRIEF DESCRIPTION OF THE DRAWINGS

The invention permits numerous embodiments. For further clarification of its fundamental principle, one of them is shown in the drawing and will be described in the following text. In the drawings.

DETAILED DESCRIPTION OF THE PRESENTLY PREFERRED EMBODIMENTS

Figure 1:
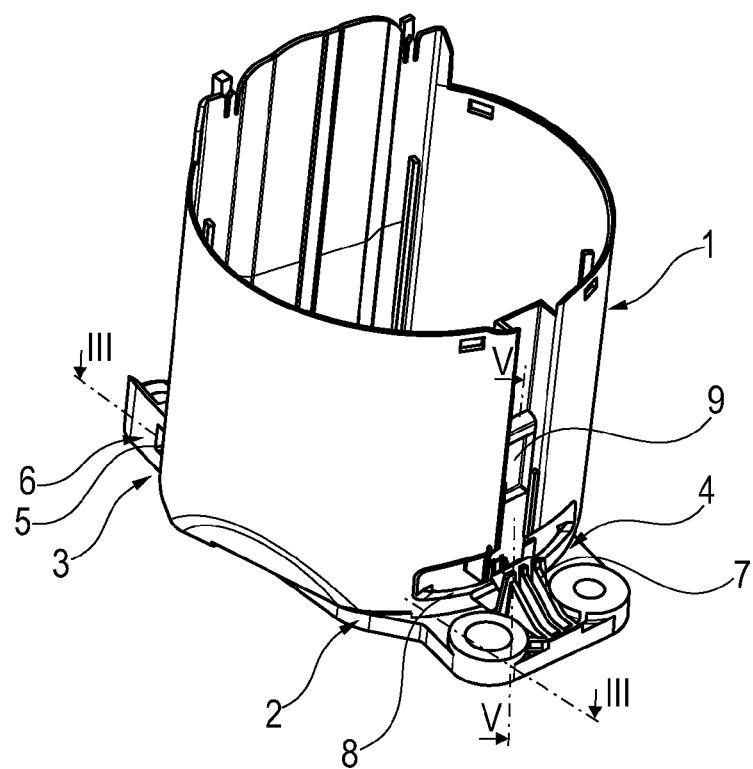
FIG. 1 perspectively shows a fuel collection device according to the invention.

FIG. 1 shows a fuel collection device for a motor vehicle with a splash pot 1 for collecting fuel and having a holding element 2. The holding element 2 serves to be fastened to a bottom (not shown) of a fuel tank. The fastening takes place, for example, by way of mirror welding. Fuel is sucked out of the splash pot 1 and is delivered to an internal combustion engine (likewise not shown) of the motor vehicle.

A fastener that connects the splash pot 1 to the holding element 2 has a hook-in connection 3 and a latching connection 4, which is spaced apart from the hook-in connection 3. The hook-in connection 3 has hooks 5 arranged on the splash pot 1 and recesses 6 arranged in the holding element 2 for receiving the hooks 5. The latching connection 4 has a latching lug 7 which is arranged on the holding element 2 for engaging behind a resilient web 8 arranged on the splash pot 1. A longitudinally displaceable slide 9 serves to block the latching connection 4 after mounting of the splash pot 1 on the holding element 2. For mounting, first of all the splash pot 1 is plugged with the hooks 5 into the recesses 6 of the holding element 2 and is pivoted toward the holding element 2. Here, the resilient web 8 slides over the latching lug 7 of the holding element 2 and snaps in behind the latching lug 7. Subsequently, the slide 9 is displaced, in order to block the latching connection 4. If the web 8 does not snap behind the latching lug 7, or if the slide 9 cannot be displaced, this is a tangible sign that the splash pot 1 is not mounted as provided. It is therefore not necessary to visually check the mounting of the splash pot 1 on the holding element 2.

Figure 2:
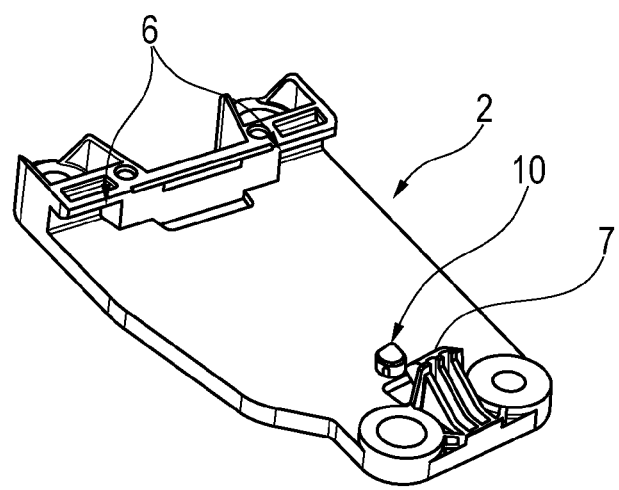
FIG. 2 shows a holding element of the fuel collection device from FIG. 1.

FIG. 2 shows the holding element 2 before mounting of the splash pot 1. It can be seen in the figure that the holding element 2 has a total of two recesses 6. A supporting element 10 protrudes close to the latching lug 7 of the latching connection 4.

Figure 3:
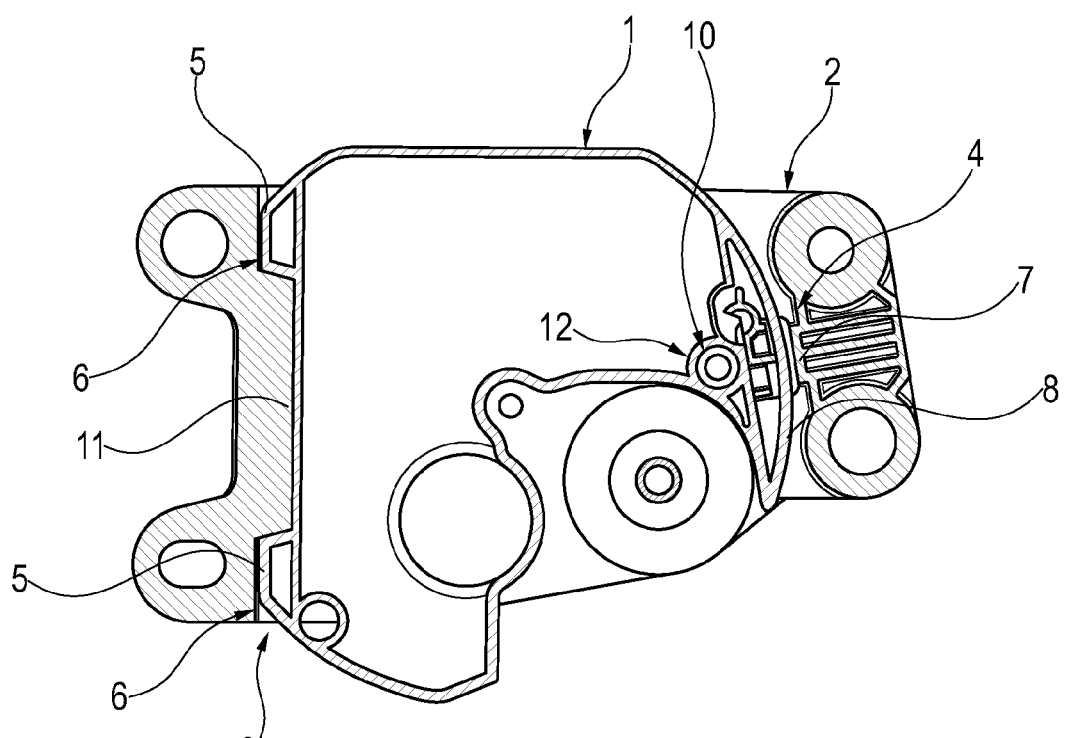
FIG. 3 shows a sectional illustration through the fuel collection device from FIG. 1 along the line III-III.

FIG. 3 shows a sectional illustration through the fuel collection device from FIG. 1 along the line III-III. It can be seen here that the splash pot 1 has in each case one hook 5 for each of the recesses 6 in the holding element 2. A support 11 between the recesses 6 has the width of the clear distance of the hooks 5. Furthermore, the splash pot 1 has a depression 12 for receiving the supporting element 10 with an accurate fit. Here, the supporting element 10 is configured as a centering pin 13. During pivoting in of the splash pot 1 onto the holding element 2, the depression 12 is pressed onto the supporting element 10. The splash pot 1 is therefore connected to the holding element 2 in a positively locking manner in the plane formed by the hooks 5 and the depression 12. Furthermore, FIG. 3 shows that the web 8 of the splash pot 1 for the latching connection 4 is of bracket-shaped design and is manufactured in one piece with the splash pot 1.

Figure 4:
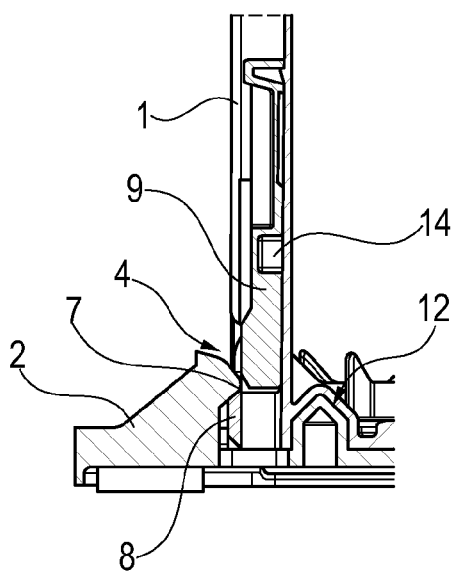
FIG. 4 shows a sectional illustration through a latching connection of the fuel collection device during mounting.

FIG. 4 shows the latching connection 4 after the splash pot 1 has been pivoted in onto the holding element 2. The latching lug 7, which engages behind the web 8 of the splash pot, 1 holds the splash pot 1 on the holding element 2. The slide 9 is still situated in a position, in which it does not influence the latching connection 4.

Figure 5:
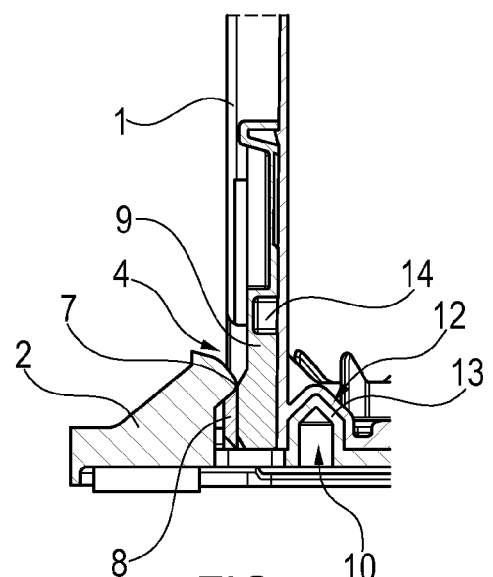
FIG. 5 shows a sectional illustration through the latching connection of the fuel collection device from FIG. 1 along the line V-V.

FIG. 5 shows the latching connection 4 from FIG. 1 along the line V-V. In comparison with the position shown in FIG. 4, the slide 9 is displaced behind the web 8 of the splash pot 1. The web 8 can therefore no longer deflect away. The latching connection 4 is therefore secured against release. The slide 9 has a magnet 14, the position of which can be detected over a provided range. As a result, in the mounted state of the splash pot 1 in the fuel tank, the position of the magnet 14 and therefore of the slide 9 can be detected from outside the fuel tank and it can therefore be determined whether the splash pot 1 has been mounted without error.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A fuel collection device for a fuel tank of a motor vehicle, the fuel collection device comprising:
   a splash pot (1) configured to collect fuel;
   a holding element (2) fastenable to a bottom of the fuel tank; and
   a fastener configured to fasten the splash pot (1) to the holding element (2), the fastener having:

(a) a hook-in connection (3) having at least one hook (5) and a recess (6), wherein, for pivoting in of the hook (5):
  the at least one hook (5) is arranged on the holding element (2) and the recess (6) is arranged oppositely on the splash pot (1), or
  the at least one hook (5) is arranged on the splash pot (1) and the recess (6) is arranged oppositely on the holding element (2), and
(b) a latching connection (4) arranged so as to lie opposite the hook-in connection (3) and configured to fix the splash pot (1) transversely with respect to a mounting direction of the hook-in connection (3).

2. The fuel collection device as claimed in claim 1, wherein the hook-in connection (3) has two recesses (6) spaced apart from one another, and the hook (5) comprises two hooks, each hook being configured to penetrate into a respective one of the two recesses (6).

3. The fuel collection device as claimed in claim 2, further comprising a support (11) arranged between the two recesses (6), the support (11) having a width that corresponds to a clearance distance between the two hooks (5).

4. The fuel collection device as claimed in claim 3, further comprising a supporting element (10) configured to support the splash pot (1) transversely with respect to the mounting direction of the hook-in connection (3).

5. The fuel collection device as claimed in claim 4, wherein the supporting element (10) is arranged closer to the latching connection (4) than to the hook-in connection (3).

6. The fuel collection device as claimed in claim 5, wherein the supporting element (10) has a centering pin (13) and an oppositely disposed depression (12) configured to receive the centering pin (13) with an accurate fit, wherein:
  the centering pin (13) projects from the holding element (2) and the splash pot (1) has the depression (12) configured to receive the centering pin (13), or
  the centering pin (13) projects from the splash pot (1) and the holding element (2) has the depression (12) configured to receive the centering pin (13).

7. The fuel collection device as claimed in claim 6, wherein the centering pin (13) projects perpendicularly from the holding element (2) and is arranged proximate to the latching connection (4).

8. The fuel collection device as claimed in claim 7, wherein the latching connection (4) further comprises a spring element arranged on the splash pot (1), and the holding element (2) has exclusively fixed components of the latching connection (4).

9. The fuel collection device as claimed in claim 8, wherein the spring element of the latching connection (4) is configured as a resilient web (8) integrally formed with the splash pot (1), and the holding element (2) has a latching lug (7) configured to engage behind the resilient web (8).

10. The fuel collection device as claimed in claim 1, wherein the splash pot (1) has a slide (9) configured to block the latching connection (4), the slide (9) being configured such that the slide (9) is displaceable exclusively when the splash pot (1) is mounted on the holding element (2) and the slide (9) is not displaceable when the splash pot (1) is not mounted on the holding element (2).

\* \* \* \* \*